United States Patent Office 3,083,238
Patented Mar. 26, 1963

3,083,238
FLUORINATED HYDROCARBON POLYMERS AND PREPARATION THEREOF
Murray Hauptschein, Glenside, and Milton Braid, Philadelphia, Pa., and Francis Lawlor, Mesa, Ariz., assignors to Pennsalt Chemicals Corporation, Philadelphia, Pa., a corporation of Pennsylvania
No Drawing. Filed Dec. 11, 1957, Ser. No. 701,995
11 Claims. (Cl. 260—648)

This invention relates to a new method for producing polymers of certain unsaturated fluorinated organic compounds and to novel polymeric products made thereby.

This application is a continuation-in-part of our copending application Serial No. 614,821, filed October 9, 1956, now abandoned.

In recent years, interest in fluorine containing polymeric materials has been intense. Basically, highly fluorinated polymeric materials are desirable because they are more stable to heat and chemical reagents than similar, non-fluorinated materials. Fluorinated polymers have been used in many different applications where high heat or chemical resistance is required, for example as dielectrics, fire extinguishers, heat transfer media, solvents, lubricants, plasticizers, coolants, gaskets and valve packings, and protective coatings.

One of the obstacles to the more extensive use of fluoropolymers has been that they are difficult and expensive to prepare. Many potentially attractive fluorocarbon monomers polymerize only under very rigorous conditions or only to a slight extent, e.g. to the dimer or trimer. With still others, it has not been possible to obtain any polymerization at all.

It has been proposed to overcome this difficulty by copolymerizing difficultly polymerizable monomers with monomers known to polymerize more readily. Thus, perfluoropropene has been copolymerized with ethylenically unsaturated hydrocarbons. In such copolymerization reactions, however, extraneous molecules are introduced into the polymer chain, so that all the properties of the homopolymer are not realized.

It has also been attempted to use the "telomerization" technique to achieve polymeric fluorocarbons. Thus Haszeldine (Journal of the Chemical Society 3559 [1953]) describes a classic telomerization reaction between $CF_3I$ and $CF_2=CF_2$ to give $CF_3(CF_2CF_2)_nI$ where $n$ may be as high as 20. This telomerization reaction is said to build up large molecules by the following rapid chain reaction mechanism.

(1) 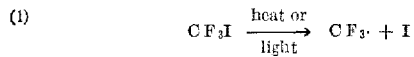

(2) 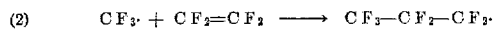

(3) 

In this mechanism the telomer chain is built up by almost instantaneous reaction between the growing telomer radical and successive molecules of olefin. The molecular size of the final product is in general independent of the time of reaction, but rather is dependent on the probability of a growing telomer radical meeting and reacting with a telogen molecule to effect chain termination, and therefore on the proportions of olefin and telogen used.

The particular reaction referred to above gave relatively high telomers of tetrafluoroethylene, but when an attempt was made to apply it to perfluoropropene, a more difficultly polymerizable monomer, using ultra-violet light as the initiating agency, no telomers were obtained having more than 2 olefin units, with nearly all the product being the 1:1 adduct, 2-iodoperfluorobutane (Haszeldine, Journal of the Chemical Society 3559 [1953]).

From these facts it could be concluded that with certain classes of unsaturated fluorinated compounds, namely with those compounds which would not readily undergo homopolymerization, telomers having more than about two units could not be formed. Attempts to force the telomer to accept more units were thought inevitably to lead to disproportionation, dimerization or internal expulsion of halogen.

It is an object of the present invention to provide a method whereby unsaturated fluorinated compounds, hitherto considered difficult or impossible to polymerize or telomerize may be built up into comparatively large molecules.

It is a further object of the invention to provide a method for making certain fluorinated polymers which is simpler and more easily controlled than methods hitherto known.

It is a further object of the invention to provide a method whereby fluorinated telomers having a specific desired molecular weight can be obtained in good yield.

It is a further object of the invention to provide novel fluorinated polymeric compounds from monomeric materials hitherto considered difficult or impossible to polymerize.

These and other objects are accomplished according to the invention, by heating at between about 150° C. and about 350° C. a telogen having the general formula $$RQ$$

where Q is selected from the group consisting of bromine and iodine, and where R is selected from the group consisting of (a) perfluoroalkyl, perfluorocycloalkyl and perfluoroalkenyl radicals; and perfluorochloroalkyl, perfluorochlorocycloalkyl, perfluorohydrocycloalkyl, perfluorochloroalkenyl and perfluorohydroalkenyl radicals in which the carbon atom which is attached to the Q atom has at least one substituent selected from the group consisting of fluorine, perfluoroalkyl radicals, and $R''CF_2$— radicals where $R''$ is a perfluorochloroalkyl or a perfluorohydroalkyl radical, and (b) groups having the general formula $$R'CXY—$$

where $R'$ is selected from the group consisting of fluorine, alkyl, aryl and aralkyl radicals; and halogenoalkyl, halogenoaryl and halogenoaralkyl radicals having not more than one iodine atom, and where X and Y are selected from the group consisting of fluorine, and perfluoroalkyl and $R''CF_2$— radicals each having up to about 5 carbon atoms, hydrogen, chlorine and bromine, provided that when X is selected from the group consisting of chlorine and bromine, Y is selected from the group consisting of fluorine, hydrogen, and perfluoroalkyl and $R''CF_2$— radicals having up to about 5 carbon atoms; provided further that when X is selected from the group consisting of chlorine and bromine and Y is selected from the group consisting of fluorine, hydrogen, and perfluoroalkyl and $R''CF_2$— radicals having up to about 5 carbon atoms, R' is selected from the group consisting of fluorine, and halogenoalkyl and halogenoaralkyl radicals having not more than one iodine atom and in which the carbon atom which is attached to the —CXY— linkage has two substituents selected from the group consisting of fluorine, chlorine, perfluoroalkyl radicals having not more than about 5 carbon atoms and R″CF$_2$— radicals having not more than about 5 carbon atoms, and has not more than one chlorine atom subtended therefrom; and provided still further that X and Y are not both hydrogen, with at least an equimolar proportion of an unsaturated, fluorinated, difficultly polymerizable compound.

As indicated above, unsaturated fluorinated difficultly polymerizable compounds are recognized by the art as comprising a particular group. For purposes of the present description and the claims appended hereto, they may be further defined as those fluorinated, unsaturated compounds which do not undergo substantial homopolymerization in the presence of a peroxide initiator at the temperature at which the initiator breaks down to form free radicals, for example, at less than 130° C. Some typical peroxide initiators are benzoyl peroxide, di-tertiarybutyl peroxide, and acetyl peroxide.

The fluorinated unsaturated compounds which are useful in the present invention are further characterized in that the product $$R(U)_nQ$$

obtained by reaction with the telogen, $$RQ$$

U designating the fluorinated unsaturated difficultly polymerizable compound, and $n$ being an integer from say 1 to 20, conforms to the definition given above for the telogen.

In the present state of knowledge it is difficult if not impossible to define the fluorinated unsaturated compounds rigorously by any simple structural characteristics. However, the following structure covers many of them:

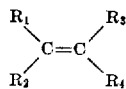

where
(a) $R_1$ is selected from the group consisting of F and H.
(b) $R_2$ is selected from the group consisting of F, H and —CF$_3$.
(c) $R_3$ is selected from the group consisting of F, —CF$_2$Cl and —CF$_3$, provided that when $R_1$ and $R_2$ are both F, $R_3$ may also be H; and
(d) $R_4$ is —CF$_2R_a$ where $R_a$ is selected from the group consisting of F, Cl, alkyl having up to about 8 carbon atoms, halogenoalkyl having up to about 8 carbon atoms and not more than one iodine atom, aryl, halogenoaryl having not more than 1 iodine atom, aralkyl having up to about 5 carbon atoms in the alkyl group, and halogenoaralkyl having up to about 5 carbon atoms in the alkyl group and not more than one iodine atom; provided that
(e) When both $R_1$ and $R_2$ are H or F, and $R_3$ is F, or —CF$_3$, $R_4$ can be —CF$_2$Br, —CF$_2$I or —CF$_2R_a$;
(f) When $R_1$ is H or F, $R_3$ is F and $R_4$ is —CF$_2R_a$, $R_2$ may be Cl or Br;
(g) When $R_1$ and $R_3$ are F, $R_2$ and $R_4$ taken together may constitute a cyclic perfluoromethylene, perfluorochloromethylene or perfluorohydromethylene chain having from 2 to 4 carbon atoms;
(h) When any two of $R_1$, $R_2$ and $R_3$ are F and the other is H, F or Cl; $R_4$ may be a perfluoroalkenyl, perfluorochloroalkenyl or perfluorohydroalkenyl radical having up to about 8 carbon atoms;
(i) When $R_1$, $R_2$ and $R_3$ are all F, $R_4$ may be alkyl having up to about 8 carbon atoms, halogenoalkyl having not more than one iodine atom and up to about 8 carbon atoms, halogenoaryl having not more than one iodine atom, aralkyl having up to about 5 carbon atoms in the alkyl group and halogenoaralkyl having up to about 5 carbon atoms in the alkyl group and not more than one iodine atom;
(j) When both $R_1$ and $R_2$ are H or F and $R_3$ is Cl, $R_4$ may be —CF$_2R_a$.

As used in the present specification, the prefix "perfluoro" means that the compound so described contains nothing but carbon and fluorine.

The term "perfluorochloro" means that the compound so described contains only carbon, fluorine and chlorine and that the molar ratio of fluorine to chlorine is at least 1.

The term "perfluorohydro" means that the compound so described contains only carbon, hydrogen, and fluorine and that the molar ratio, fluorine to hydrogen is at least 1.

It has been found, surprisingly, that when the supposedly nonreactive fluoroolefins and fluoro diolefins of the class described are heated with telogens of the type defined above at the temperatures indicated, reaction occurs with relative ease to give high molecular weight products.

Most of the compounds have not been made hitherto and the invention therefore includes, as well as the method described, compounds having the general formula $$R(U)_nQ^1$$

where R and U are as defined above, $Q^1$ is a halogen atom and $n$ is an integer from 1 to about 20, provided that when U is a perfluoropropene radical $n$ is greater than 2. Certain other specific compounds are also considered to be within the scope of the broad invention.

As described more fully below, the initial compound where Q is bromine or iodine may be stabilized by replacing the bromine or iodine with chlorine or fluorine by conventional procedures. In like manner an initial iodine compound may be converted to a bromine compound, if desired.

The mechanism of the reaction defined above is different from that postulated previously in connection with the telomerization of tetrafluoroethylene. Instead of chain propagation taking place through reaction between a growing telomer radical and successive molecules of olefin, as in reaction (3) above, step-wise addition takes place with the telomeric iodo- or bromo- compound being formed in each case.

In the present case, even in the presence of very large excesses of olefin, no evidence of free radical chain propagation was obtained, since after a short time the only product isolated was the 1:1 adduct. The 1:1 adduct is thus the precursor of the 2:1 adduct which in turn is the precursor of the 3:1 adduct, etc.

This is illustrated in the reaction of perfluoropropyl iodide:

(4)  C$_3$F$_7$I+CF$_2$=CFCF$_3$→C$_3$F$_7$CF$_2$CF(CF$_3$)I
(5)  C$_3$F$_7$CF$_2$CF(CF$_3$)I+CF$_2$=CFCF$_3$→
          C$_3$F$_7$[CF$_2$CF(CF$_3$)]$_2$I
(6)  C$_3$F$_7$[CF$_2$CF(CF$_3$)]$_n$I+CF$_2$=CFCF$_3$→
          C$_3$F$_7$[CF$_2$CF(CF$_3$)]$_{n+1}$I

The maintenance of an energy level sufficiently high to promote and sustain the reaction is no doubt one of the principal reasons why telomers of unreactive olefins can be produced at appreciable rates by thermal synthesis in accordance with the present invention, but not by the photochemical or peroxide-induced initiation previously employed.

The class of difficultly polymerizable unsaturated fluorinated compounds defined above as suitable for use in the present invention includes such specific compounds as CF$_3$CF=CF$_2$, CF$_2$ClCF=CF$_2$, CF$_3$CH=CF$_2$
CF$_3$CCl=CF$_2$, (CF$_3$)$_2$C=CF$_2$, CF$_3$CF=CFCl
CF$_3$CH=CFCl, CFCl=CFCl, CF$_3$CF=CH$_2$,
CF$_2$ICF=CF$_2$, CF$_2$BrCF=CF$_2$, CF$_3$CF=CFCF$_3$ $CF_2=CFCF=CF_2$, $CFCl=CFCF=CF_2$
$CF_2=CClCF=CF_2$, $CFCl=CFCF=CFCl$
$CF_2=CClCCl=CF_2$, $CF_2=CFCH=CF_2$,
$CHF=CFCF=CF_2$, $CF_2=CHCH=CF_2$
$CHF=CFCFCl_2$, $CHF=CFCF_3$
$CF_2=CF(CH_2)_6CH_3$, $CF_2=CFCHClCH_3$
$CF_2=CF(C_6H_4Cl)$, $CF_2=CF(C_6H_4(CH_3))$
$CF_2=CF(C_6H_4(CH_2Cl))$, $CF_2=CHCF_2CH_3$
$CF_2=CHCF_2CH_2Cl$, $CF_2=CHCF_2(C_6H_5)$
$CF_2=CHCF_2(C_6H_4Cl)$, $CF_2=CHCF_2(C_6H_4(CH_3))$
$CF_2=CHCF_2(C_6H_4(CH_2Cl))$, $CH_2=CCF_3CF_2I$
$CF_2=C(CF_3)CF_2(C_3H_7)$, $CHCl=CFCF_3$
$CH_2=CClCF_2CH3$

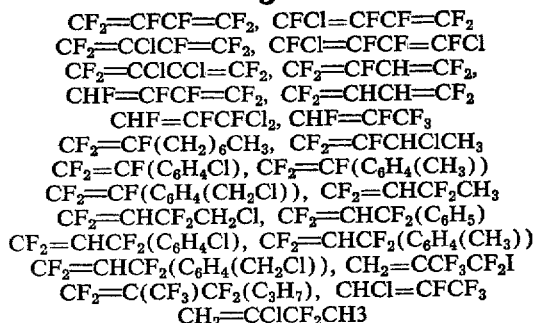

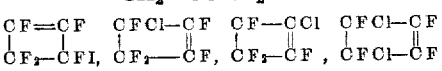

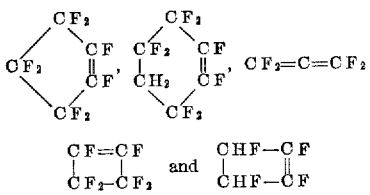

All these compounds are either impossible or very difficult to polymerize by peroxide or free radical initiation.

The telogens which may be used in the present invention include such specific compounds as $CF_3I$, $C_3F_7I$, $CF_3Br$, $C_4F_9CF(CF_3)I$, $C_4F_9CF(CF_3)Br$
$C_4F_9CF(CF_3)CF_2CF(CF_3)I$, $CF_2ClCHClI$
$CF_3CFICF_2I$, $CF_2ICF_2CF_2I$, $CF_2ICF_2I$, $CF_2Br_2$
$CF_2ClBR$, $(CF_3)_2CFBr$, $CF_2BrCFBrCF_3$, $CF_2ClCFClI$
$CF_3CFICF_2Cl$, $CF_2=CFI$, $CF_2=CFCF_2I$, $CF_2=CFBr$
$CF_2=CHCF_2I$

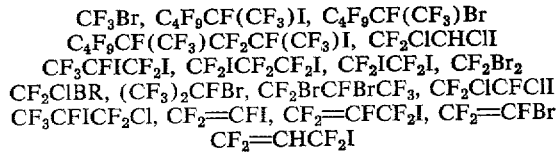

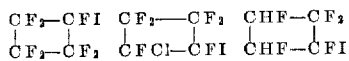

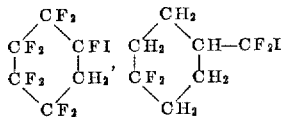

$(C_6H_5)CF_2I$, $CF_3CHClI$, $CF_2ClCHClI$
$C_6H_5CF_2CHClI$, $Cl(C_6H_4)CFClCHClI$
$(C_6H_{11})CF(CF_3)C(CF_3)ClI$, $CFCl=CF_2CF_2I$
$CHF=CF_2CF_2I$, $Cl(C_6H_4)CF_2I$, $CH_3(C_6H_4)CF_2I$
$CH_2Cl(C_6H_4)CF_2I$, $C_3H_7CF(CF_3)I$, $C_3F_7CHBrI$,
and $C_4H_9CHClCF_2CHClI$ In some cases the telogen may be formed in situ, by the addition of, for example, $I_2$, $ICl$, or $Br_2$ to the unsaturated compound.

In general, the iodo compounds are preferred over the corresponding bromo compounds.

The reaction conditions will vary to some extent, depending on the particular reactants and the type of product desired.

The temperature should in general be between about 100° C. and about 350° C., preferably between about 160 and about 250° C. The reaction may be carried out at atmospheric pressure, but preferably high pressures are used, for example up to about 20,000 p.s.i.g. usually between about 500 p.s.i.g. and about 10,000 p.s.i.g.

With respect to the proportions of telogen and unsaturated compound used, for maximum yields of any desired telomer it is always necessary to use at least the stoichiometric amount of olefin required by the telomer it is desired to produce, over the entire period of the reaction. Moreover, considered at any instant of time it is preferred to have at least an equimolar amount of unsaturated compound present. Preferably the proportion of unsaturated compound is between about 2 and about 20 times the molar amount of telogen and usually between about 2 and about 10 times the molar amount of telogen.

The reaction time is not critical in the sense that it determines whether or not the reaction will go, but it is an important variable in determining the conversion obtained and the molecular size of the product. Since the reaction proceeds stepwise, i.e. the 1:1 adduct reacts with additional unsaturated compound to form the 1:2 adduct and so on, the reaction time for any desired chain length must be sufficient to permit the precursors to form and react. In general, the longer the reaction time, the greater the proportion of high molecular weight product obtained, and when a short reaction time is used, only low molecular weight product is obtained. In this the present process is clearly different from conventional telomerizations proceeding by free radical chain mechanism in which the chain length is determined primarily by the proportion of telogen or chain transfer agent used. Thus in prior art processes when an excess of olefin is present only high molecular weight products are obtained even with short reaction times.

In the present process the specific reaction time will depend on the particular reactants and on the efficiency of contact between them. In general, it will be from about 3 hours to 3–4 weeks, preferably from about 6 hours to 2 weeks.

Telomers made according to the invention will undergo a variety of other reactions. In many cases, for example, it is desirable to replace the Q atom (Br or I) with chlorine or fluorine to enhance the stability of the telomer. These replacements may be carried out by any conventional method, for example by reaction with elemental chlorine at a pressure of say atmospheric to 10,000 p.s.i.g. and at a temperature of say room temperature to 270° C.; or by reaction with cobalt trifluoride at a temperature of say 100 to 270° C.

Telomers made according to the present invention may also be stabilized by heating them at a temperature somewhat higher, e.g. 50–200° higher, than the optimum temperature used in the formation of the telomer, for example at 200–550° C. By this procedure, the Q atom (Br or I) is removed, as $Q_2$, and the stabilized products include coupled telomers of the general type $$R(U)_{2n}R$$

Coupled products of this general class and the general methods for their manufacture are described in the copending application of R. N. Haszeldine, Serial No. 179,217 filed March 12, 1962; and in Patent No. 3,046,304 of R. N. Haszeldine. Application Serial No. 179,217, owned by the assignee of the present application, is a continuation of application Serial No. 680,924, filed August 29, 1957, which in turn was a continuation-in-part of application Serial No. 526,087, filed August 2, 1955, and application Serial No. 377,716, filed August 31, 1953. Applications Serial Nos. 680,924, 526,087 and 377,716 have all now been abandoned.

The physical properties of the compounds obtained in accordance with the present invention vary with the starting compounds and the size of the product. The utility of the compound and its stabilized analogues, of course, varies with these properties.

In general, it may be said that compounds and particularly the stabilized analogues made in accordance with the present invention are suitable for the same applications in which similar, non-fluorinated compounds are employed, with the added advantage that the fluorinated compounds have in general higher stability to heat and chemically attack. In addition, compounds of the present invention may be used in many instances where there is no parallel use of non-fluorinated analogues.

Specifically, stabilized products made in accordance with the invention have high dielectric strength and are, therefore, useful as insulators and condenser fluids.

Those stabilized products which are oils provide superior hydraulic fluids and permanent lubricants for instruments. They are useful as mold release agents, and, in the laboratory, as stopcock lubricants. Their chemical and thermal stability makes them excellent heat transfer media and refrigerants. They can also be used to advantage as damping fluids in shock absorbers and the like.

Stabilized products made in accordance with the invention are further useful as ingredients for polishes and as water and oil repellent finishes for textiles. As specifically described below, they can be used as plasticizers for fluoropolymers. In particular, it has been found that polytetrafluoroethylene can be plasticized by compounds boiling above 100° C. at atmospheric pressure and having the formula $$R_c[CF_2CF(CF_3)]_nX$$

where $n$ is an integer from 1 to about 20, $R_c$ is selected from the group consisting of perfluoroalkyl and perfluorochloroalkyl and $X$ is selected from the group consisting of F, Cl and $R_c$ [$CF_2CF(CF_3)$]$_n$ The lower telomers, i.e. where $n$ is 1 and 2, such as $CF_2Cl[CF_2CF(CF_3)]_{1-2}Cl$, $CF_3[CF_2CF(CF_3)]_{1-2}Br$, $CF_2Br[CF_2CF(CF_3)]_{1-2}Br$ and the like, are valuable as vapor phase coolants and dielectrics for electrical equipment and as vapor phase coolants in processes where leaks in a coolant system would cause violent reactions if ordinary organic coolants were used. They are also useful as temperature differential fluids in thermometric devices.

The lower telomer iodides where $n$ is up to about 5 avg. are especially useful as bactericidal and bacteriostatic agents. Compounds such as $$C_3F_7[CF_2CF(CF_3)]_{1-5}I$$

act as iodine carriers and when applied to a surface will release iodine slowly, providing a long lasting potent germicidal barrier. They are particularly suited to use on the skin because the fluorocarbon portion of the molecule is inert and will not be absorbed. The telomers in which $n$ is 1 or 2 are especially suitable for solution or lotion formulations in concentrations of 1:10 to 1:1000 and have the advantage of a high weight proportion of iodine. The telomers in which $n$ is 3 to about 5 are useful in salves and ointments.

The invention will be further described with reference to the following specific examples, it being understood that the examples are given for purposes of illustration only and are not to be taken as in any way restricting the invention beyond the scope of the appended claims.

EXAMPLE I

A 300 ml. Monel autoclave was charged with 98.0 g. (0.331 mole) of 1-iodoperfluoropropane. After cooling in Dry Ice, 240 g. (1.6 moles) of perfluoropropene were introduced by vacuum transfer. The autoclave was then closed and heated with shaking to about 200° C. for a period of four days. During this period the pressure dropped from 4600 p.s.i.g. to 2100 p.s.i.g., most of the drop occurring during the first day. There were recovered 157 g. perfluoropropene and 6.7 g. 1-iodoperfluoropropane. The total of 176 g. of product was separated into individual telomer fractions by rectification. Conversion was 88% based on moles of iodide converted to telomer.

These fractions were:

(a) $C_3F_7[CF_2CF(CF_3)]I$—44 mole percent of total product. This fraction had a boiling point of 110° C. at 760 mm. and 62° C. at 95 mm., and an index of refraction $n_D^{24}=1.3284$. Analysis showed F=55.4%; Calculated F=55.4%.

(b) $C_3F_7[CF_2CF(CF_3)]_2I$—28 mole percent of total product. This fraction had a boiling point of 62° C. at 10 mm. and 104° C. at 100 mm., and a refractive index $n_D^{24}=1.3310$. Analysis showed C=18.0, F=60.5% by weight. Calculated for this telomer C=18.1, F=60.6% by weight.

(c) $C_3F_7[CF_2CF(CF_3)]_3I$—16 mole percent of total product. This fraction had a boiling point of 101° C. at 10 mm. and a refractive index $n_D^{24}=1.3340$ and a molecular weight of 746. Analysis showed C=19.4, F=63.6% by weight. Calculated for this telomer C=19.3, F=63.7% by weight.

(d) $C_3F_7[CF_2CF(CF_3)]_4I$—8 mole percent of total product. This fraction had a boiling point of 83° C. at about 0.1 mm., indices of refraction $n_D^{19}=1.3395$, $n_D^{24}=1.337$. Analysis showed C=20.3, F=66.0% by weight. Calculated for this telomer C=20.1, F=65.7%.

(e) A fifth fraction was obtained in which the average value of $n$ was 5. This constituted about 4 mole percent of the total product.

In carrying out the above procedures, precautions were taken to exclude oxygen.

EXAMPLES II TO X

The procedure of Example I was carried out using different molar ratios of telogen to olefin. The results of these runs are compiled in Table I below and the properties of the products in Table II.

EXAMPLE XI

The procedure of Example I was repeated, but the autoclave was repressured to 4700 p.s.i.g. after one day with perfluoropropene. A conversion comparable to that described in Example I was obtained in two days, i.e. 48 hours total reaction time.

EXAMPLE XII

The procedure of Example I was carried out using

*Table I*

| Example | Mole ratio $C_3F_6/C_3F_7I$ | Time (hrs.) | Pressure Initial | Pressure Terminal | Percent conversion [1] | Percent yield $n=1$ | $n=2$ | $n=3$ | $n=4$ | $n=5$ avg. | $n=7$ avg. | $n=10$ avg. |
|---|---|---|---|---|---|---|---|---|---|---|---|---|
| II | [2] 1.32 | [a] 41 | 2,100 | 800 | 37 | 72 | 22 | 5 | 1 | | | |
| III | [2] 1.39 | 88 | 2,000 | 1,000 | 37 | 84 | 14 | 2 | | | | |
| IV | 1.51 | 64 | 2,800 | 1,200 | 50 | 68 | 22 | 10 | [3] | | | |
| V | 2.63 | 22 | 3,600 | 2,300 | 41 | 75 | 18 | 7 | [3] | | | |
| VI | 2.75 | 42 | 5,000 | 2,900 | 57 | 63 | 22 | 15 | [3] | | | |
| VII | 4.07 | 63 | 4,700 | 2,300 | 73 | 56 | 24 | 16 | 4 | | | |
| VIII | 4.26 | 112 | 3,000 | 1,300 | 84 | 65 | 21 | 13 | 1 | | | |
| IX | 4.89 | 20 | 4,600 | 3,500 | 52 | 66 | 19 | 16 | [3] | | | |
| X | 10.4 | 336 | 4,700 | 1,900 | 94 | 7 | 11 | 41 | 30 | 3 | 7 | 2 |

[1] Conversion of iodide to telomer.
[2] No shaking.
[3] Small amounts of n=4 included in n=3.
[a] 220° C.

Table II

| $C_3F_7(CF_2CF)_nI$ | B.P °C. | B.P Mm. | M.P. °C. | $n_D^t$ | Temp., °C. | Mol. weight Calc. | Mol. weight Found | max.,[1] m$\mu$ | $\epsilon$[2] | Carbon Calc. | Carbon Found | Fluorine Calc. | Fluorine Found |
|---|---|---|---|---|---|---|---|---|---|---|---|---|---|
| n=1 | 62 | 95 | | 1.3284 | 24 | 446 | | 282 | 210 | 16.2 | | 55.4 | 55.4 |
| n=2 | 105, 62 | 760, 10 | | 1.3310 | 24 | 596 | | 282 | 210 | 18.1 | 1.80 | 60.6 | [3] 60.5 |
| n=3 | 104, 101 | 100, 10 | | 1.3340 | 24 | 746 | | 282 | 200 | 19.3 | 19.4 | 63.7 | 63.6 |
| n=4 | 83 | Ca.0.1 | | 1.3395, 1.337 | 19, 24 | 896 | | 282 | 190 | 20.1 | 20.3 | 65.7 | 66.0 |
| n=3.7 (avg.)[4] | 73–94 | Ca.0.1 | | 1.336 | 24 | | [5] 854 | 282 | | | | | |
| n=7(avg.)[6] | 125–135 | <0.1 | 55–58 | | | 1,346 | [5] 1,300 | 282 | | 21.4 | 21.4 | 69.2 | 69.4 |
| n=10(avg.)[6] | 135–160 | <0.1 | 74–80 | | | 1,786 | [5] 1,700 | 282 | | 22.1 | 22.2 | 70.9 | 70.7 |

[1] Ultra-violet spectrum maxima in isooctane, 2,3,3-trichloroheptafluorobutane and 1,2,2-trichlorotrifluoroethane.
[2] Molar extinction coefficient in isooctane.
[3] Calc. for $C_9F_{19}I$: I, 21.29, Found: 21.1.
[4] Kinematic viscosities in centistokes: 199.5 (78.4° F.), 11.7 411.4° F.), 4.04 (197.8° F.).
[5] Mol. weight calculated in the usual way from the absorbency (at 282 m$\mu$) of a known concentration in isooctane, 2,3,3-trichloroheptafluorobutane or 1,2,2-trichlorotrifluoroethane.
[6] Solids at room temperature.

55 g. (0.338) mole) of iodine monochloride and 316 g. (2.11 moles) perfluoropropene. The reactants were heated with shaking at 210–215° C. for 30 hours and then at 225° C. for 167 hours. The observed pressure drop was 1900 p.s.i. The product

$$CF_2ClCF(CF_3)[CF_2CF(CF_3)]_nI$$

(131 g.) was rectified to give the following fractions ranging from a light to a viscous oil to a solid:

| | Percent |
|---|---|
| (a) Boiling point below 34° at 100 mm. | 25 |
| (b) Boiling point below 35–100° at 100 mm. | 33 |
| (c) Boiling point below 40–67° at ca. 0.1 mm. | 24 |
| (d) Boiling point below 67–99° at ca. 0.1 mm. | 9 |
| (e) Boiling point 99 to above 132° at ca. 0.1 mm. | 8 |
| (f) Residue, M.P. 41–52° C. | 1 |

Fractions (a) and (b) contained n=1 and 2. Fraction (b) had an average n value of 1.5. Fraction (c) had an average n of 3; fraction (d) of 4; fraction (e) of 5; and the residue (F) of 7.

EXAMPLE XIII

The telogen $CF_2ClCF(CF_3)I$ is formed by heating ICl with $CF_3CF=CF_2$. Using a molar ratio of telogen to olefin of about 1:10, this $CF_2ClCF(CF_3)I$ is then heated with perfluoropropene at 225° C. for about 150 hours. Telomers of the formula $$CF_2ClCF(CF_3)[CF_2CF(CF_3)]_nI$$

where n is from 1 to about 7 avg. are formed.

EXAMPLE XIV

A Monel autoclave was charged with 27.6 grams of iodine and 202 grams of perfluoropropene. The autoclave was heated with shaking at 200 to 250° for 300 hours. There was recovered approximately 155 grams of perfluoropropene and 33 grams of material boiling above room temperature in vacuo were collected. The most volatile fraction boiled up to 53° at less than 0.1 mm. The following three higher boiling fractions were isolated:

(1) A light oil, boiling at 53–75° C. at less than 0.1 mm.
(2) A medium oil, boiling at 75–105° C. at less than 0.1 mm.
(3) A low melting solid boiling at 105 to approximately 200° C. at less than 0.1 mm.

EXAMPLE XV

Into a 300 ml. Monel autoclave containing 100 g. (0.32 mole) of 1,2-dibromoperfluoropropane and cooled to −75° C., 224 g. (1.49 moles) of perfluoropropene were condensed in vacuo. The autoclave was sealed and heated at a temperature of 255° C. with shaking for 560 hours. The pressure dropped from 4100 to 1675 p.s.i. during this time. From this reaction there were recovered, by condensation in refrigerated receivers during venting of the autoclave, 40 g. of the olefin, and, by careful fractionation of the less volatile reaction products, 55 g. of the reactant dibromide and 120 g. of a bromine-free fluorocarbon, B.P. 44–45° C., perfluoro(dimethylcyclobutane). By means of fractional distillation of the remaining liquid reaction products, the telomer bromides, $CF_2BrCF(CF_3)[CF_2CF(CF_3)]_nBr$, were obtained in the following respective conversions and yields: 30% and 60% where n=1, a liquid (45 g.), middle cut, B.P. 80° C. at 100 mm., $n_D^{26}$ 1.3448; Analysis.—Calculated for $C_6F_{12}Br_2$; C, 15.7, F, 49.7. Found: C, 15.8, F, 50.2; 15% and 30% where n=2, a liquid (30 g.), middle cut, B.P. 78° C. at 9 mm., $n_D^{25}$ 1.3435; Analysis.—Calculated for $C_9F_{18}Br_2$: C, 17.8, F, 56.2. Found: C, 17.8, F, 56.6; 5% and 10% where n=3.5 av. (containing n=3—5), a moderately viscous liquid (15 g.), middle cut, B.P. 48–49° C. at ca. 0.1 mm., $n_D^{27}$ 1.3423; Analysis.—Calculated for $C_{13.5}F_{27}Br_2$: C, 19.4, F, 61.5. Found: C, 19.5, F, 61.5. A small residue (n=6 estd.) remained undistilled.

EXAMPLE XVI

The procedure of Example XV is repeated using 0.32 mole of $Br_2$ and 1.81 moles of perfluoropropene. The telogen $CF_2BrCF(CF_3)Br$ is formed in situ and the ultimate products are substantially those obtained in Example XV.

EXAMPLE XVII

The procedure of Example I was carried out using $C_3F_6$ and $C_4F_9CFICF_3$, in the molar ratio

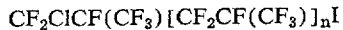

$$C_3F_6/C_4F_9CFICF_3=2.97$$

The reaction was carried out at 200° C. for 21.5 hours. The pressure fell from 2400 p.s.i.g. at the outset, to 1950 p.s.i.g. at the end of the run. A 23% conversion was obtained comprising the following fractions:

(a) $C_4F_9CF(CF_3)(C_3F_6)_2I$—79% on the weight of total product.
(b) $C_4F_9CF(CF_3)(C_3F_6)_3I$—21% on the weight of total product.

EXAMPLE XVIII

A 2700 ml. stainless steel autoclave was charged with 875 g. (2.96 moles) of 1-iodoperfluoropropane and 2233 g. (14.85 moles) of perfluoropropene. The autoclave was then closed and heated with shaking at 180–190° C. for 65 hours and at 203° C. for an additional 48 hours. During this period, the pressure dropped from 5000 p.s.i. to 3100 p.s.i. The autoclave was next repressured with 225 g. (1.5 moles) of perfluoropropene and kept at 203°

C. for 111 hours. The pressure drop was from 4550 to 3150 p.s.i. There were recovered 132 g. of $C_3F_7I$ and about 1650 g. of perfluoropropene. There were isolated 1520 g. of telomer, $C_3F_7[CF_2CF(CF_3)]_nI$, consisting of 449 g. ($n=1$); 407 g. ($n=2$); 467 g. ($n=3$); 44 g. ($n=4$); 151 g. ($n=5-10$).

EXAMPLE XIX

The procedure of Example I was carried out using 100 g. (0.224 mole) of $C_4F_9CFICF_3$ and 310 g. (2.07 moles) of perfluoropropene. The reaction was carried out at 204° C. for 137 hours. The pressure fell from 9000 p.s.i.g. at the outset to 4800 p.s.i.g. at the end of the run. The following telomer fractions were isolated:

$$C_3F_7[CF_2CF(CF_3)]_nI$$

were $n=1$ and 2 (21 g.) and where $n=3-10$ (140 g.). 74 g. of the last fraction ($n=5-10$) was a balsam-like solid.

EXAMPLE XX

A 2700 ml. stainless steel autoclave was charged with 883 g. of 2-iodoperfluorohexane and 2450 g. of perfluoropropene. The autoclave was heated with shaking at 180–190° C. for 48 hours, (pressure changed from 6500 to 5500 p.s.i.) and then at 200–203° C. for 233 hours (pressure changed from 5500 to 3800 p.s.i.). About 1800 g. of perfluoropropene and 150 g. of 2-iodoperfluorohexane were recovered. There was isolated about 1310 g. of telomer, $C_3F_7[CF_2CF(CF_3)]_nI$ consisting of 1000 g. ($n=2-5$); 185 g. ($n=5-7$); and 120 g. ($n=7-10$).

EXAMPLE XXI

The procedure of Example I was repeated using

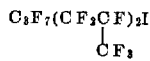

as the telogen. The ratio

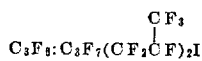

was 7.47. The reaction was conducted at 200° C. for 144 hours. Initial pressure was 3400 p.s.i.g.; final pressure, 1700 p.s.i.g. A conversion of about 80% was obtained comprising about 50% by weight of product having less than 4 —($C_3F_6$)— units per molecule and about 50% by weight having 4 or more —($C_3F_6$)— units per molecule.

EXAMPLE XXII

The procedure of Example I was carried out using 100 g. (0.168 mole) of $C_3F_7[CF_2CF(CF_3)]_2I$ and 325 g. (2.16 moles) of perfluoropropene. The reaction was carried out at 192–200° C. for 137 hours. The pressure fell from 10,700 p.s.i.g. at the outset to 5950 p.s.i.g. at the end of the run. There were isolated from the 182 g. of product, the following telomer fractions having the general formula $C_3F_7[CF_2CF(CF_3]_nI$:

(1) $n=3-5$, 84 g.
(2) $n=6-12$, 58 g., B.P. 140–190° C. at $<0.1$ mm.
(3) $n=13-15$, 40 g., residue boiling above 190° C. at $<0.1$ mm.

Fractions (2) and (3) were transparent, friable solids.

EXAMPLE XXIII

The procedure of Example I was repeated using $CF_3I$ as the telogen. The mole ratio $C_3F_6:CF_3I$ was 4.64. The reaction was conducted at 200° C. for 113 hours. The initial pressure was 3500 p.s.i.g. falling to 1800 p.s.i.g. at the end of the run. A conversion of 68% was obtained, to give the following products:

(a) $CF_3(C_3F_6)I$—48% by weight. This fraction boiled at 64° C. at 760 mm. and had a refractive index $n_D^{25}=1.3282$. Analysis showed C=13.8, F=49.6 percent by weight. Calculated for this compound, C=13.9, F=49.4.

(b) $CF_3(C_3F_6)_2I$—22% by weight. This fraction boiled at 64° C. at 71 mm. and had a refractive index $n_D^{26}=1.3322$. Analysis showed C=17.1, F=57.3 percent by weight. Calculated for this telomer, C=17.0, F=57.5.

(c) $CF_3(C_3F_6)_3I$—17% by weight. This fraction boiled at 73° C. at 100 mm. and had a refractive index $n_D^{25.5}=1.3350$. Analysis showed C=18.8, F=61.8. Calculated for this telomer C=17.0; F=57.5.

(d) A fourth fraction had an average of about five —$C_3F_6$— groups. It was about 13% of the total product.

EXAMPLE XXIV

The procedure of Example XXIII was carried out using a $C_3F_6:CF_3I$ ratio of 5.43. The reaction was carried out at 194° C. for 122 hours. The initial pressure was 4150 p.s.i.g. falling to 2800 p.s.i.g. at the end of the reaction. A conversion of about 51% was obtained, the product comprising 47% by weight $CF_3(C_3F_6)I$, 23% $CF_3(C_3F_6)_2I$, 19% $CF_3(C_3F_6)_3I$, 8% $CF_3(C_3F_6)_4I$ and 4% of material having an average of eight —($C_3F_6$)— groups per molecule.

The telomer $CF_3(C_3F_6)_4I$ boiled at 105° C. at 10 mm. and had an index of refraction $n_D^{25}=1.3368$. Analysis showed C=19.8, F=64.4 percent by weight. Calculated for this telomer, C=19.6, F=64.4 percent by weight.

The material, having an average of eight —($C_3F_6$)— units contained a fraction having an average of 9 olefin units, a fraction having an average of 11 olefin units and a fraction having an average of 15 olefin units.

The fraction having an average of 9 units melted at 35–42° C., boiled at 130–150° C. at ca. 0.1 mm. and had an index of refraction, $n_D^{32}=1.3358$. Analysis showed C=21.7, F=70% by weight. Calculated C=21.8, F=70.0%.

The fraction having an average of 11 olefin units boiled at 150–170° C. at ca. 0.1 mm. and melted at 47–56° C. It had an index of refraction, $n_D^{35}=1.3357$. Analysis showed C=22.2% by weight. Calculated C=22.1, F=71.0.

The fraction having an average of 15 olefin units had a melting point of 68–76° C.

EXAMPLE XXV

Forty-two grams (0.20 mole) of dibromodifluoromethane and 151 g. (1.01 moles) of perfluoropropene were condensed in vacuo in a 140 cc. Monel autoclave cooled in Dry Ice. The autoclave was sealed and heated at a temperature of 245° C. for 10 days while shaking. During this period the pressure dropped from 4000 to 1700 p.s.i., about one-half of the drop occurring during the first day.

From this reaction there were recovered by venting through refrigerated receivers 75 g. of perfluoropropene, 4 g. of dibromodifluoromethane and 4 g. of perfluoro(dimethylcyclobutane). The remaining liquid products were rectified in a small Vigreux still. The resulting fractions were shown by their infrared spectra to consist entirely of telomer bromides, $BrCF_2[CF_2CF(CF_3)]_nBr$, which may be regarded as homologues of the telomer bromide series $Br[CF_2CF(CF_3)]_nBr$ derived from $$CF_2BrCFBrCF_3$$

described previously. Thus, with values of $n$ estimated by comparison with the latter series, the composition of the remaining products was found to be 20 (weight)% $n=1$ av., B.P. mainly 40–50° C./100 mm., 20% $n=2$ av., B.P. mainly 93–95° C./100 mm., 20% $n=3$ av., B.P. mainly 80–87° C./8 mm., 15% $n=4$ av., B.P. mainly 45–55° C./ca. 0.1 mm. and 10% $n=5$ av. (containing $n=4-6$) B.P. 55–124° C./ca. 0.1 mm. For an intermediate fraction, B.P. 82–114° C./8 mm., $n=3.5$ av., the following values were determined: viscosities, 13.46 cs. (centistokes) at 78.4° F., 7.3 cs. at 100° F. (extrapolated), 4.33 cs. at 123.8° F., 1.48 cs. at 197.6° F. and 1.3 cs. at 210° F. (extrapolated), ASTM slope (78–198° F.), 1.26; $d_4^{26}$ 2.1312. For a fraction, B.P. 78–124°/ca. 0.1 mm., $n=5+_{av.}$, viscosities were 13,190 cs. at 78.4° F., 1400 cs. at 100° F. (extrapolated), 240 cs. at 123.8° F., 11.8 cs. at 197.6° F. and 8.6 cs. at 210° F. (extrapolated), ASTM slope (78–198° F.), 1.29.

EXAMPLE XXVI

A 300 cc. Monel autoclave was cooled to −75° C. and evacuated. Seventy five grams (0.50 mole) of bromotrifluoromethane and 300 g. (2.0 moles) of perfluoropropene were condensed in the autoclave by gaseous transfer. The reaction mixture was shaken and heated finally at a temperature of 260° C. for 296 hours. During this time the pressure dropped from 9000 to 5600 p.s.i. After cooling to room temperature, the autoclave was vented slowly through a series of refrigerated receivers at atmospheric pressure. Recovered from the Dry Ice-cooled receivers were 60 g. of bromotrifluoromethane and 110 g. of perfluoropropene. Collected from the brine-cooled receivers and the autoclave were 200 g. of higher boiling liquid which was carefully fractionated. By this means there were obtained 155 g. of perfluoro(dimethylcyclobutane), and about 10 g. of $CF_3CF_2CFBrCF_3$ (estimated by vapor-liquid chromatography.) A fraction (11 g.) B.P. 119–121° C. middle cut 121° C., colorless liquid, $n_D^{30}$ 1.3044 was $CF_3[CF_2CF(CF_3)]_nBr$ where $n=2$. Analysis.—Calculated for $C_7F_{15}Br$: F, 63.5, Br, 17.8. Found: F, 63.3, Br, 17.0. The telomer bromide where $n=3$ was collected as a fraction (10.5 g.) middle cut, B.P. 93° C. at 50 mm., colorless liquid, $n_D^{28}$ 1.3139. Analysis.—Calculated for $C_{10}F_{21}Br$: C, 20.1; F, 66.6, Br, 13.3. Found: C, 20.6, F, 67.1, Br, 12.7. The remaining fraction (5 g.) B.P. 51–160° C. at ca. 0.1 mm. was $n=$ca. 5.5 av. (estimated) containing $n=4-7$. The last portion of this fraction became solid at room temperature. Finally, a residue of higher telomer, 1 g. remained undistilled.

EXAMPLE XXVII

A Monel autoclave was charged with 65.0 g. of 1-iodoperfluoropropane, and 95 g. of 2,3,3,3-tetrafluoropropene-1 ($CF_3CF=CH_2$) was then added by vacuum transfer. The autoclave was heated with shaking at 187–190° C. for 89 hours. The pressure fell from 1100 p.s.i. at the outset to 150 p.s.i. at the end of the run. There were recovered 45 g. of the tetrafluoropropene and 15.9 g. of 1-iodoperfluoropropane. The total of 88.2 g. of product, $C_3F_7[CH_2CF(CF_3)]_nI$ wherein $n$ was 1–10 av., was separated into various fractions by rectification. The lower boiling fractions (ca. 33 g.) boiled mostly at 80–122° C. at 18 mm. The higher boiling fractions were:

(a) 12 g.—B.P., 84–104° C. (0.1 mm.), $n_D^{25}=1.3503$.
(b) 7.8 g.—B.P., 104–110° C. (0.1 mm.), $n_D^{25}=1.3518$.
(c) 13.7 g.—B.P., 122–137° C. (<0.1 mm.), $n_D^{25}=1.3502$.
(d) 7.2 g.—B.P., 137–170° S. (<0.1 mm.), $n_D^{38.5}=1.3522$.
(e) 2.5 g. residue.

Fractions (a) to (d) ranged from a light oil to a very heavy oil. Residue (e) was a solid.

The ultra-violet spectra maxima in isooctane were mostly at 272–274 m$\mu$. The infra-red spectra of all of the samples were nearly identical. They all had bands at 3.3$\mu$ (CH—stretching). Strong bands were present at 7.4–9.0$\mu$ (C—F stretching), 10.8$\mu$, 12.6$\mu$ and a doublet, 13.48 and 13.65 $\mu$.

Telomers of 2,3,3,3-tetrafluoropropene-1 and their manufacture are described and claimed in our copending application Serial No. 251,073, filed January 14, 1963, which is a continuation-in-part of this application.

EXAMPLE XXVIII

A Monel autoclave was charged with 24.0 g. of 1-iodoperfluoropropane and 54.5 g. of perfluorobutadiene. The autoclave was heated with shaking at 210° C. for 16 hours. The pressure fell from 600 p.s.i.g. at the outset to zero p.s.i.g. at the end of the run. There were recovered 33.7 g. of perfluorobutadiene and 4 g. of 1-iodoperfluoropropane. There was collected 37.0 g. of a product "A" ranging from a light oil to a heavy oil and waxy solid. A 16 g. aliquot of product "A" was fractionally distilled. Approximately ⅔ of the material boiled at 41–128° C. at 68 mm. and ⅓ at 58–190° C. at below 0.1 mm. The ultra-violet spectra of these samples had maxima in isooctane at about 270 m$\mu$.

EXAMPLE XXIX

The procedure of Example XXVIII was carried out using 20 g. of product "A" from Example XXVIII and 36.7 g. of perfluorobutadiene. The reaction was carried out at 210° C. for 5 days. There were recovered 18.8 g. of perfluorobutadiene. The total of 27 g. of product was separated into various fractions by rectification. The three highest boiling fractions were (a) 7.2 g.—B.P., 42–105° C. (0.1 mm.), $n_D^{23}=1.3589$
(b) 6.2 g.—B.P., 105–210° C. (0.1 mm.), $n_D^{41}=1.3562$
(c) 1.5 g.—B.P., 210–225° C. (0.1 mm.), $n_D^{45}=1.3635$ Fraction (b) was a highly viscous oil. Fraction (c) was a waxy solid with pour point at about 35° C. The infrared spectra of fractions (a), (b), and (c) as well as the higher boiling third of Example XXVIII were almost identical. The ultra-violet spectra maxima in isooctane were at about 270 m$\mu$.

EXAMPLE XXX

A Monel autoclave was charged with 120 g. of 1-iodoperfluoropropane and 262 g. of perfluorocyclobutene. The autoclave was heated with shaking at 210–270° C. for 72 hours. The pressure fell from 4800 p.s.i. (210° C.- at the outset to 3050 p.s.i. (210° C.) at the end of the run. There were recovered approximately 150 g. of perfluorocyclobutene and 35 g. of 1-iodoperfluoropropane. There was collected 187 g. of product containing

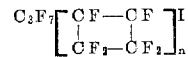

This was separated into the following fractions by rectification:

(1) 55.4 g.—B.P., 35–87° C. (100 mm.), $n_D^{22}=1.3338$
(2) 14.7 g.—B.P., 87–95° C. (100 mm.), $n_D^{20}=1.3418$
(3) 10.9 g.—B.P., 95–110° C. (100 mm.), $n_D^{20}=1.3419$
(4) 10.2 g.—B.P., 110–125° C. (100 mm.), $n_D^{21}=1.3462$
(5) 27.1 g.—B.P., 70–78° C. (0.1 mm.), $n_D^{21}=1.3500$
(6) 32.7 g.—B.P., 100–146° C. (0.1 mm.), $n_D^{21.5}=1.354$
(7) 18.8 g.—B.P., 146–165° C. (0.1 mm.), $n_D^{22}=1.3588$
(8) 1.9 g.—B.P., 165–180° C. (0.1 mm.), $n_D^{40}=1.3558$

Fractions (1) and (2) contained

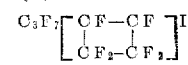

Fractions (3) and (4) contained

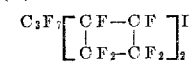

Fractions (5) to (8) contained higher telomers having up to 10 perfluorocyclobutene units. There was also a small residue containing from 10 to 20 olefin units. Fractions (6) and (7) were medium to heavy oils. Fraction (8) was a waxy solid with pour point at about 27–30° C. The ultra-violet spectra maxima in isooctane were at about 270 m$\mu$. The infra-red spectra of fractions (5) to (8) were almost identical. The appearance of bonds at 5.62 and 5.84 m$\mu$ (double bond region) in these spectra which were also found in the perfluorobutadiene reactions (Examples XXVIII and XXIX) suggest that at least some rearrangement of perfluorocyclobutene to perfluorobutadiene occurred during the thermal reaction and that the gross product was not pure telomer.

EXAMPLE XXXI

Perfluorocyclobutene (202 g.) was transferred in vacuum to a 300 ml. Monel autoclave which contained 265 g. 1,2-dichloro-1,1,2-trifluoroiodoethane. The autoclave was sealed and heated in a shaking apparatus for 158 hours at 225° C. There was a pressure drop from about 5250 p.s.i.g., which was noted when the temperature reached 225° C., to 3825 p.s.i.g. when the heating was discontinued. The autoclave was cooled to room temperature and vented. The residual contents were filtered to remove a small amount of iodine and the filtrate was distilled. Unreacted $CF_2ClCFClI$ was removed at a pressure of 80 mm. Hg at 37–45° C. The remaining liquid was fractionated to yield 50 g.

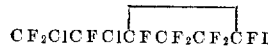

boiling at 61–66° C. (23 mm. Hg) $n_D^{27.5}$ 1.4073; 14.4 g.

boiling at 73–79° C. (5 to 6 mm. Hg) $n_D^{24.5}$ 1.3963. Analysis of the low boiling fraction showed 16.6% C, 0.0% H, 28.4% I; calculated for $C_6Cl_2F_9I$: 16.3% C, 0.0% H, 28.8% I. Analysis of the high boiling fraction showed 19.4% C, 0.0% H, calculated for $C_{10}Cl_2F_{15}I$: 19.9% C, 0.0 H. There was left in the distilling flask 6 g. of viscous oil consisting of higher telomers,

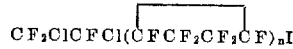

where $n=3$ and 4.

The 1:1 adduct described above, 1-(1,2-dichloro-1,2,2-trifluoroethyl)-2-iodohexafluorocyclobutane, is claimed in our copending application Serial No. 250,761, filed January 11, 1963, which is a continuation-in-part of this application.

EXAMPLE XXXII

A 300 ml. Monel autoclave filled with Monel balls to reduce the effective volume to 150 ml. was charged with 50 g. of $CF_2ClCFClI$ and 75 g. of perfluoropropene and heated for 112 hours at 172–197° C. in a molten salt bath and then for 15.5 hours in a shaker at 201° C. during this period the pressure dropped from 950 p.s.i. at 172° C. to 750 p.s.i. at 201° C. At this time an additional 20 g. of perfluoropropene was charged into the autoclave which was heated for 40 hours more at 201° C. Seventy grams of olefin and 15 g. of $CF_2ClCFClI$ were recovered. Rectification of the remaining product,

in vacuo gave the following fractions:

(a) $n=1$ (25 g.) B.P. mostly 58.5–60.5° C. at 20 mm., $n_D^{25}=1.3908$. Analysis showed C=14.5% by weight. Calculated C=14.0% by weight.

(b) $n=2$ (15 g.) B.P. mostly 97.5–104° C. at 20 mm. $n_D^{25}=1.3760$. Analysis showed C=16.8% by weight. Calculated C=16.6%.

(c) $n=3$ average (7 g.) B.P. mostly 77–87° C. at ca. 0.1 mm. $n_D^{27}=1.3706$.

(d) $n=4$ average (4 g.) B.P. 87–138° C. at ca. 0.1 mm., $n_D^{27}=1.3691$. Analysis showed C=19.0% by weight. Calculated C=19.1%.

Under conditions similar to those used in Example X, products having up to 10 olefin units per molecule may be obtained.

EXAMPLE XXXIII

CHLORINATION OF TELOMER

A 300 ml. Monel autoclave was charged with 200 g. (0.335 mole) of $C_3F_7[CF_2CF(CF_3)]_2I$, sealed, and cooled to —78° C. Seventy-five grams of chlorine (1.055 moles) were admitted to the autoclave which was then heated with shaking at 203° C. for 17 hours.

Excess chlorine was vented from the autoclave and the remaining material was washed with water, 10% aqueous caustic solution, and water, then dried and distilled. (With higher telomers $CF_2ClCFCl_2$ solvent was used to reduce the viscosity during washing, etc.) There were obtained 150 g. (0.297 mole) of chlorinated product, $C_3F_7[CF_2CF(CF_3)]_2Cl$ representing an 89% yield.

Yields of 85–100% were obtained by chlorination of the other telomer iodides. Some physical properties of the series $C_3F_7[CF_2CF(CF_3)]_nCl$ are listed in Tables III and IV.

EXAMPLE XXXIV

FLUORINATION OF TELOMER

Into a 2-liter Monel metal round-bottom flask equipped with a steel wire Hershberger stirrer and a copper, water-cooled condenser were charged 418 g. (0.350 mole) of a mixture of fluorocarbon iodides,

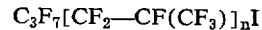

where $n=6$ average, and 395 g. (3.41 moles) of cobalt trifluoride. The mixture was heated with stirring to 190° C. during 1.5 hours and the temperature was maintained at

*Table III*

PHYSICAL CONSTANTS OF STABILIZED TELOMERS

| Formula | Boiling point | | $n_D^t$ | Temp., ° C. | Pour point or melting point, ° C. | Analysis | | | |
|---|---|---|---|---|---|---|---|---|---|
| | | | | | | Carbon, percent | | Fluorine, percent | |
| | ° C. | Mm. Hg | | | | Calc. | Found | Calc. | Found |
| $C_3F_7[CF_2CF(CF_3)]_1Cl$ | 82 | 760 | 1.2826 | 26 | <—80 | 20.3 | 20.0 | 69.7 | 69.8 |
| $C_3F_7[CF_2CF(CF_3)]_2Cl$ | 134 | 760 | 1.299 | 22 | <—80 | 21.4 | 21.7 | 71.5 | 71.8 |
| $C_3F_7[CF_2CF(CF_3)]_3Cl$ | 75 | 8 | 1.3091 | 22 | <—80 | 22.0 | 22.0 | 72.6 | |
| $C_3F_7[CF_2CF(CF_3)]_4Cl$ | 112 | 10 | 1.3169 | 20 | Ca. —15 | 22.4 | 22.3 | 73.2 | 73.8 |
| $C_3F_7[CF_2CF(CF_3)]_{5av}Cl$ | 66–96 | <0.1 | 1.3172 | 30 | Ca. 10 | 22.6 | 22.6 | 73.6 | 73.7 |
| $C_3F_7[CF_2CF(CF_3)]_{6av}Cl$ | 96–117 | <0.1 | 1.3205 | 31 | Ca. 25 | 22.8 | 22.6 | 74.0 | 73.7 |
| $C_3F_7[CF_2CF(CF_3)]_{8av}Cl$ | 117–150 | <0.1 | Solid | | 38–42 | 23.1 | 23.1 | 74.4 | 74.4 |
| $C_3F_7[CF_2CF(CF_3)]_{9av}Cl$ | 150–170 | <0.1 | Solid | | 58–70 | 23.2 | 23.0 | 74.5 | 74.6 |
| $C_3F_7[CF_2CF(CF_3)]_3F$ | 115–116 | 98 | ¹ 1.290 | 30 | Ca. —40 | 22.6 | 22.7 | 77.4 | 77.6 |
| $C_3F_7[CF_2CF(CF_3)]_4F$ | 143–145 | 95 | 1.3003 | 30 | Ca. —10 | 22.9 | 22.8 | 77.1 | 77.3 |
| $C_3F_7[CF_2CF(CF_3)]_5F$ | 173 | 95 | 1.3067 | 30 | Ca. 15 | 23.0 | 22.8 | 77.0 | 77.1 |
| $C_3F_7[CF_2CF(CF_3)]_{6av}F$ | 84–143 | Ca. 0.1 | 1.3112 | 29 | Ca. 20 | 23.2 | 23.0 | 76.8 | 76.9 |
| $C_3F_7[CF_2CF(CF_3)]_{9av}F$ | 130–180 | <0.1 | Solid | | 58–64 | 23.5 | 23.5 | 76.5 | 76.7 |
| $C_3F_7[CF_2CF(CF_3)]_{12av}F$ | 165–210 | <0.1 | 1.314 | 27 | 71–75 | | | | |

¹ Estimated.

Table IV

| Formula | Kinematic Viscosities (Centistokes) of Stabilized Telomers | | | | | |
|---|---|---|---|---|---|---|
| | 78.4° F. | 141.4° F. | 197.8° F. | 100° F.[1] | 210° F.[a] | ASTM slope [b] |
| $C_3F_7[CF_2CF(CF_3)]_3Cl$ | 1.421 | 0.698 | 0.461 | 0.65 | 0.35 | 1.46 |
| $C_3F_7[CF_2CF(CF_3)]_3Cl$ | 4.68 | 2.07 | 0.897 | 2.98 | 0.813 | 1.33 |
| $C_3F_7[CF_2CF(CF_3)]_4Cl$ | 43.11 | 8.13 | 2.003 | 17.3 | 1.74 | 1.34 |
| $C_3F_7[CF_2CF(CF_3)]_{5 av}Cl$ | 157.95 | | 5.66 | 210 | 4.55 | 1.29 |
| $C_3F_7[CF_2CF(CF_3)]_{3 av}Cl$ | 1610.97 | | 16.40 | 5,100 | 11.9 | 1.34 |
| $C_3F_7[CF_2CF(CF_3)]_{3 av}F^c$ | 3.58 | 1.47 | 0.79 | 2.55 | 0.45 | 1.34 |
| $C_3F_7[CF_2CF(CF_3)]_{4}+F^d$ | 36.75 | 4.77 | 1.84 | 15.0 | 1.60 | 1.38 |
| $C_3F_7[CF_2CF(CF_3)]_{3 av}F$ | 1501.97 | | 9.11 | 6,300 | 6.5 | 1.64 |

[a] Extrapolated. [b] The viscosity values lie on a straight line when plotted on an ASTM (D341-43) viscosity chart. The ASTM slope is the slope of this line showing the temperature dependence of viscosity. [c] Distillation range 67-77° C. (9 mm); pour point, about −60° C., $N_D 25=1.292$. [d] Distillation range 77-126° (9 mm); pour point, −21° C., $N_D 25=1.3031$.
[1] At 123.8° F.

230–250° C. for several hours. The reaction mixture was then cooled, a fresh 100 g. portion (0.86 mole) of cobalt trifluoride was added and heating was resumed at 230° C. for two additional hours. After cooling, a copper distillation head and receiver were substituted for the condenser, the flask was heated, and the pressure was reduced to ca. 0.1 mm. to allow the crude product, 291.5 g. (76.5% of theory), to be distilled. The final pot temperature reached during distillation was 275° C. The crude product was taken up in $CF_2ClCFCl_2$ to reduce the viscosity and washed with dilute hydrochloric acid, dilute caustic, and finally water, and then dried. Rectification through a Vigreux still was employed to separate components of various $n$ values. Constants and physical properties of some members of this series, $C_3F_7[CF_2—CF(CF_3)]_nF$ are listed in Tables III and IV.

EXAMPLE XXXV

FLUORINATION OF 2-IODOPERFLUOROHEXANE

Cobalt trifluoride (60 g.) supported on copper shot was placed in a vertical copper tube, which was surrounded by a tube furnace. 2-iodoperfluorohexane (20 g., 0.0448 mole) was added drop by drop on top of the cobalt trifluoride under a dry nitrogen atmosphere at 260–290° C. The exit gases were condensed in a Dry Ice-cooled trap, washed with 5% sodium hydroxide (some handling losses occurred), dried with Drierite and distilled to give only n-perfluorohexane (75%), B.P. 54° C., as shown by its infra-red spectrum.

EXAMPLE XXXVI

STABILIZATION BY HEATING

A 2.7 l. 316 stainless steel autoclave was charged with 875 g. of iodoperfluoropropane and 2050 g. of perfluoropropene and then heated at 200° C. for 60 hours with continuous shaking. The temperature was then allowed to rise to about 300–305° C. for several hours. From this reaction were recovered 1355 g. of perfluoropropene, ca. 65 g. of iodine, and 1360 g. of higher boiling products. The latter were shown to be composed of iodine-free stabilized fluorocarbon materials in addition to the usual telomer iodides. Fractionation of this material by means of a 1 inch diameter by 1 foot glass helices-packed column was used to separate 667 g. of 2-iodoperfluorohexane. The remaining 693 g. of product (ranging from oils to solids) boiling from 100° C. at 100 mm. to >110° C. ca. 0.1 mm. consisted of approximately 20% by weight of perfluoro-5, 6-dimethyldecane, 25% of higher coupling products, and 55% of higher telomer iodides.

EXAMPLE XXXVII

Strips of polymerized tetrafluoroethylene, 1/16" thick and 1/4" wide, were heated at 310° C. in both $$C_3F_7[CF_2CF(CF_3)]_nF \text{ and } C_3F_7[CF_2CF(CF_3)]_nCl$$

These latter compounds were oils having distillation ranges of 84–143° C. at <0.1 mm. and 96–117° C. at <0.1 mm., respectively. After about 4 hours the strips were removed from the oil and wiped thoroughly. The strips were about 20% heavier and noticeably softer and more pliable.

EXAMPLE XXXVIII

A polytetrafluoroethylene tape, 5 mils thick and 0.1 inch wide was immersed in $C_3F_7[CF_2CF(CF_3)]_{3 av}Cl$ at 100° C. overnight. After removal of excess chloride by drainage, the plasticized strip was tested in an Instrom tester for percent elongation and tensile strength. It was found that the original unplasticized strip broke under a load of 2.6 lbs. and gave an elongation of 190%. The plasticized strip broke under a load of 3.7 lbs. and gave an elongation of 410%.

Similar results were obtained using $$C_3F_7[CF_2CF(CF_3)]_{5 av} \text{ and } C_3F_7[CF_2CF(CF_3)]_{6}F$$

as well as the coupling product $\{C_3F_7[CF_2CF(CF_3)]_{2-3}\}_2$.

Thus by using the products of the present invention a greatly improved polytetrafluoroethylene tape can be obtained, useful, for example, in insulating wires. In particular, use of the present invention overcomes the lack of elasticity and strength hitherto considered inherent in polytetrafluoroethylene tapes.

EXAMPLE XXXIX

One half gram of $C_3F_7[CF_2CF(CF_3)]_3I$ was diluted with acetone to give a 10% solution. This solution was further diluted to 1% with a sterile soap solution. Using the standard FDA Phenol Coefficient Test, the 1% solution was found to prevent the growth of *Salmonella typhosa* (Hopkins) and *Micrococcus pyrogenes* var. *aureaus* No. 209. The Germicide-Agar Dilution Test, a standard bacteriostatic test, also showed that a 1% solution of the above compound prevents growth of the two organisms referred to.

What is claimed is:

1. A polymeric product having the general formula $R(U)_nQ$ where Q is a halogen atom, R is selected from the group consisting of perfluoroalkyl, perfluorocycloalkyl, and perfluoroalkenyl radicals; and perfluorochloroalkyl, perfluorohydroalkyl, perfluorochlorocycloalkyl, perfluorohydrocycloalkyl, perfluorochloroalkenyl, and perfluorohydroalkenyl radicals in which the carbon atom nearest to the Q atom has at least one substituent selected from the group consisting of halogen, perfluoroalkyl radicals and $R'CF_2$-radicals where $R'$ is selected from the group consisting of perfluorochloroalkyl and perfluorohydroalkyl radicals, U is a bifunctional group derived from a perfluorinated unsaturated compound selected from the group consisting of perfluorobutadiene, perfluorocyclobutene, and olefins having the formula $$R''—CF=CF_2$$

where $R''$ is a perfluoroalkyl group having not more than 8 carbon atoms, and $n$ is a number at least equal to 3.

2. The product claimed in claim 1 wherein R is a perfluoroalkyl group and U is derived from perfluoropropene.

3. Compounds having the general formula $$CF_3[CF_2CF(CF_3)]_nQ$$

where Q is a halogen atom and n is from 3 to about 20.

4. Compounds having the general formula $$C_3F_7[CF_2CF(CF_3)]_nQ$$

where Q is a halogen atom and n is from 3 to about 20.

5. Compounds having the general formula $$CF_2ClCFCl[CF_2CF(CF_3)]_nQ$$

where Q is a halogen atom and n is an integer from 3 to about 20.

6. Compounds having the general formula $$CF_2ClCF(CF_3)[CF_2CF(CF_3)]_nQ$$

where Q is a halogen atom and n is an integer from 3 to about 20.

7. Compounds having the general formula $$CF_2ClCFCl\left[\begin{array}{c}-CF-CF-\\|\quad\;|\\CF_3\;\;CF_3\end{array}\right]_nQ$$

where Q is a halogen atom and n is from 3 to about 20.

8. Compounds having the general formula $$C_3F_7\left[\begin{array}{c}-CF-CF-\\|\quad\;|\\CF_3\;\;CF_3\end{array}\right]_nQ$$

where Q is a halogen atom and n is from 3 to about 20.

9. A method for producing organic fluorinated compounds which comprises heating, at a temperature between about 160° C. and about 350° C., a telogen having the general formula RI, where R is selected from the group consisting of perfluoroalkyl, perfluorocycloalkyl and perfluoroalkenyl radicals; and perfluorochloroalkyl, perfluorohydroalkyl, perfluorochlorocycloalkyl, perfluorohydrocycloalkyl, perfluorochloroalkenyl and perfluorohydroalkenyl radicals in which the carbon atom which is attached to the iodine atom has at least one substituent selected from the group consisting of halogen, perfluoroalkyl radicals and R'CF$_2$-radicals where R' is selected from the group consisting of perfluorochloroalkyl and perfluorohydroalkyl radicals, with an unsaturated, fluorinated compound selected from the group consisting of compounds having the formula R''—CF=CF$_2$, where R'' is a perfluoroalkyl group having not more than 8 carbon atoms, perfluorobutadiene and perfluorocyclobutene, the molar ratio of unsaturated compound to telogen being between about 2:1 and about 20:1.

10. The method claimed in claim 9 wherein the telogen is a perfluoroalkyl iodide and the unsaturated compound is perfluoropropene.

11. The method claimed in claim 9 wherein the telogen is formed in situ by reaction of the unsaturated compound with a halogenating agent selected from the group consisting of I$_2$ and ICl.

References Cited in the file of this patent

UNITED STATES PATENTS

| | | |
|---|---|---|
| 2,440,800 | Hanford et al. | May 4, 1948 |
| 2,875,253 | Barnhart | Feb. 24, 1959 |
| 2,880,247 | Miller | Mar. 31, 1959 |
| 2,880,248 | Miller | Mar. 31, 1959 |

OTHER REFERENCES

Henne et al.: Jour. Am. Chem. Soc., vol. 73, pp. 1791 and 1792, April 1951.

Haszeldine: Jour. Chem. Soc., July 1952, pp. 2504–2513 (only pp. 2510 and 2511 necessary).

Haszeldine et al.: Jour. Chem. Soc., April 1953, pp. 1199–1206.

Haszeldine et al.: Jour. Chem. Soc., May 1953, pp. 1592–1600.

Haszeldine: Jour. Chem. Soc., December 1955, pp. 4291–4302.

UNITED STATES PATENT OFFICE
CERTIFICATE OF CORRECTION

Patent No. 3,083,238                       March 26, 1963

Murray Hauptschein et al.

It is hereby certified that error appears in the above numbered patent requiring correction and that the said Letters Patent should read as corrected below.

Column 5, line 34, for that portion of the compounds reading "$CF_2ClBR$" read -- $CF_2ClBr$ --; lines 40 to 44, the formula should appear as shown below instead of as in the patent:

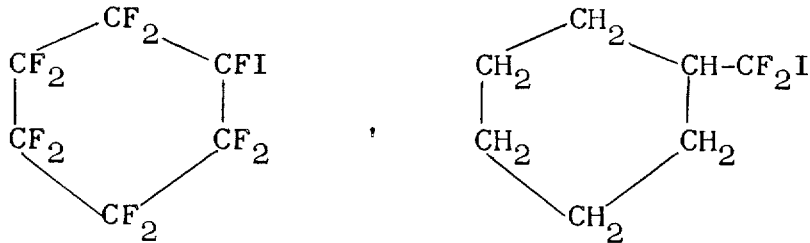

column 6, line 70, for "chemically" read -- chemical --; column 7, line 26 should appear as shown below instead of as in the patent:

as $CF_2Cl[CF_2CF(CF_3)]_{1-2}Cl$,   $CF_3[CF_2CF(CF_3)]_{1-2}Br$, column 9, line 23, for "(0.338) mole)" read -- (0.338 mole) --; columns 9 and 10, Table II, twelth column, line 2 thereof, for "1.80" read -- 18.0 --; same columns, footnote 4 of the table, for "11.7 411.4° F.)" read -- 11.7 (141.4° F.) --; column 11, line 57, for $C_3F_7[CF_2CF(CF_3)]_nI$" read -- $C_3F_7[CF_2CF(CF_3)]_nI$ --; line 67, for "$C_3F_6;CF_3I$" read -- $C_3F_6:CF_3I$ --; column 13, line 51, for "$C_3F_7[CH_2CF(CF_3]_nI$" read -- $C_3F_7[CH_2CF(CF_3)]_nI$ --; line 60, for "137-170° S." read -- 137-170° C. --; line 69, for "(CH-stretching)" read -- (C-H stretching) --; column 14, line 39, for "(210° C.-" read -- (210° C.) --; column 15, line 32, for "0.0 H" read -- 0.0% H --; columns 17 and 18, Table IV, the sub-heading of the third column from the right, for "100° F.1" read -- 100° F.a --.

Signed and sealed this 10th day of December 1963.

(SEAL)
Attest:
ERNEST W. SWIDER
Attesting Officer

EDWIN L. REYNOLDS
Acting Commissioner of Patents